United States Patent Office 2,725,258
Patented Nov. 29, 1955

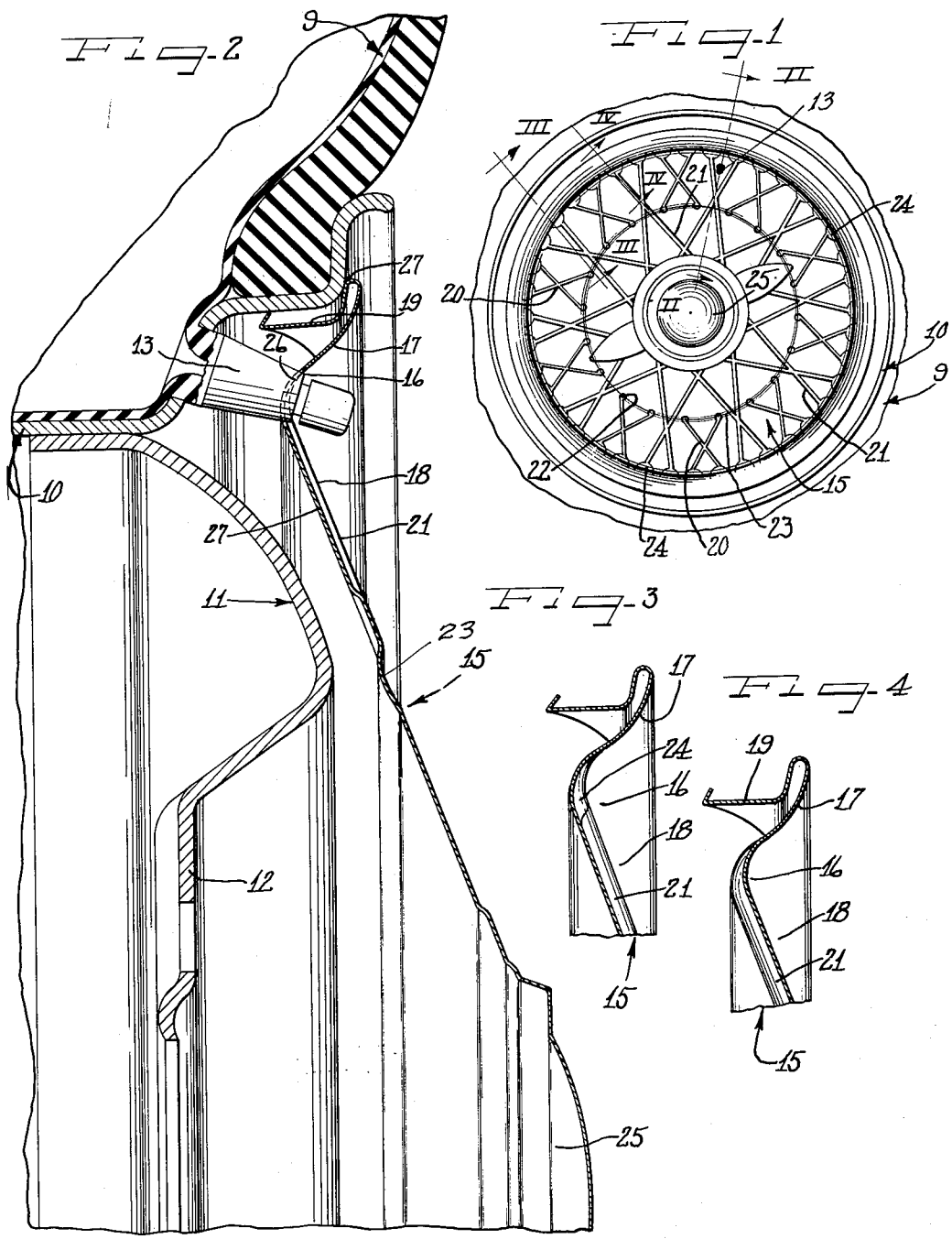

2,725,258

WHEEL COVER

George Albert Lyon, Detroit, Mich.

Application July 10, 1952, Serial No. 298,125

5 Claims. (Cl. 301—37)

This invention relates to wheel covers and more particularly to a wire spoke simulating automobile wheel cover.

At the present time there is a tendency in the automobile industry, on the part of automobile designers, to revive the use of so-called wire spoke wheels due to the desire in the industry to offer automobiles which will have a different look or appearance from those which have been on the market for the past ten years or so. Considerable resistance is being offered to this effort by engineers for the reason that wire spoke wheels are heavier than disk wheels and will thus add to the unsprung weight on the automobile and in addition such wheels are considerably more expensive than the conventional disk wheels.

I propose, in accordance with the features of this invention, to provide a light-weight wheel cover or disk which will provide the existant wheel with the desired new wire spoke appearance without materially adding to the unsprung weight or cost of the wheel as a whole.

I also aim, in accordance with the features of this invention, to provide a wheel cover with wire simulating spokes so that when the cover is used on an existant disk wheel already in use, the wheel will be caused to have the appearance of being a wire spoke wheel.

It is also an object of this invention to provide a wire spoke simulating wheel cover which lends itself to economical manufacture on a large production scale from sheet material such, for example, as light-weight steel strip.

In accordance with the general features of this invention, there is provided a circular member having an annular dished portion defining radially outwardly and inwardly divergent areas, the inwardly divergent area being radially inclined in cross section and having formed therein non-radial wire spoke simulating ribs.

Another feature of the invention relates to providing the wire spoke simulating ribs in the cover by embossings which will have a metallic or lustrous finish, whereas the portions of the cover between the ribs will be in color so as to accentuate the embossed rib-like spokes.

Yet another feature of the invention relates to forming the embossed wire spoke simulating ribs in crisscross intersecting pairs, alternate pairs of which are longer than the other pairs so as to cause said two sets of crisscross ribs to more closely simulate the wire spokes that have been commonly used on wire wheels of the past.

A still further feature of the invention relates to slightly depressing the inclined embossed portion of the cover so that non-radial wire spoke simulating embossed ribs will be substantially flat. That is to say, I propose to compensate for the curving of the spoke that would be necessary in having it extend angularly across the inclined or frustoconical portion of the cover by slightly indenting this portion whereby each spoke can be substantially flat and be more truly representative of a wire spoke.

Other objects and features of this invention will more fully appear from the following detailed description taken in connection with the accompanying drawings which illustrate a single embodiment thereof and in which:

Figure 1 is a fragmentary side elevation of an automobile wheel equipped with my novel embossed cover;

Figure 2 is an enlarged fragmentary cross-sectional view taken on substantially the line II—II of Figure 1 looking in the direction indicated by the arrows;

Figure 3 is a fragmentary cross-sectional view taken generally on the line III—III of Figure 1 through the wheel cover and showing a spoke in elevation; and Figure 4 is a fragmentary cross-sectional view similar to Figure 3 taken on the line IV—IV of Figure 1 looking in the direction indicated by the arrows and showing the spoke in cross section.

As shown on the drawings:

The wheel illustrated in the accompanying drawings is of a so-called conventional disk type and includes the usual pneumatic tire and tube assembly 9, a multi-flanged tire rim 10 and a central dished wheel body or spider 11 on which the base of the rim is secured and carried. The central part of the body part 11 is dished at 12 for detachably fastening in the usual way to the brake drum (not shown) or the like on an automobile axle. Any suitable means such, for example, as bolts or cap screws (not shown) may be used for holding the wheel in place.

The tire and tube assembly 9 may be provided with the customary outwardly projecting valve stem 13 which, as I shall describe hereinafter, can project through the cover so as to be accessible without requiring removal of the cover.

My invention is concerned with providing a dress or appearance for this wheel which will cause it to look like an entirely different wheel, or more specifically like the old-time conventional wire spoke wheel. In such conventional wire spoke wheel as is well known in the art, crisscross wire spokes were used and they were usually arranged in pairs of long and short spokes, alternating with each other; the long ones terminating closer to the hub of the wheel, and the shorter ones terminating inwardly midway between the hub and the rim. Both sets of pairs of spokes, however, were fastened by sleeves to the base of the rim.

Now I have designated generally my novel wheel cover by the reference character 15. It may be made from any suitable sheet material, although I preferably propose to make it in the form of a metallic stamping punched from sheet or strip steel such, for example, as stainless steel strip. I not only propose to provide it with wire spoke simulating ribs, but also, in addition, I propose to provide it with sets of long and short crisscross ribs which will make the disk or cover 15 appear even more like a wire wheel in appearance.

The cover 15 includes a dished annular portion 16 spaced radially inwardly from the outer peripheral edge of the cover and defined on its sides by radially inwardly and outwardly divergent areas or portions 18 and 17. The outer portion 17, which is disposed opposite the tire rim, defines the outer edge of the cover and is turned inwardly into a plurality of cover retaining resilient fingers 19 for detachable gripping engagement with a flange of the rim. These retaining fingers do not per se constitute part of this invention and are, in fact, the subject matter of my separate copending patent application, Serial No. 223,416, filed April 27, 1951, now issued as Patent No. 2,624,634. However, it is to be appreciated that any suitable retaining means may be employed without departing from the scope and spirit of my invention which has to do primarily with the provision of a wire spoke simulating appearance for the cover.

The radially inwardly divergent portion 18 is inclined so as to also extend axially outwardly from portion 16 toward the center of the wheel. It is this portion that I propose to utilize in providing my cover with its novel wire spoke appearance. The reason for this is because this portion extends over the wheel body part 11 and terminates substantially adjacent the junction of the body part with the rim part 10. It will also be appreciated that this inclined portion 18 is generally of a frustoconical shape.

Embossed in the portion 18 are a plurality of sets of pairs of crisscross wire spoke simulating and cover reinforcing ribs 20 and 21. Each pair of ribs 22 is of a shorter length than the adjoining pairs of longer ribs 21. In addition, the shorter criss-cross ribs 20 alternate with the longer ones 21.

The inner ends of the shorter ribs 20 are slightly enlarged at 22 and terminate in a common circle 23. The circle 23 may, if it is so desired, be slightly accentuated by an annular groove in the surface of the cover. This affords the feature of the inner ends of the shorter ribs 20 appearing to terminate in a flange such as the hub flange of a wire spoke wheel.

The radially inner ends of the longer ribs 21 terminate closer to the central or hub portion 23 of the cover. However, the other and outer extremities of all the ribs terminate at the annular dished portion 16 which is adjacent the base flange of the tire rim 10. If it is so desired, each of the ribs 20—21 may have its outer end slightly enlarged at 24 so as to resemble the sleeve that usually appears on the extremity of a wire spoke.

It is important to note that due to the fact that the cover portion 18 is frustoconical in shape and due to the fact that the ribs are non-radial, or in other words at an angle to the radii of the cover, such spoke embossings would not be flat but would have to be slightly curved in order to extend crosswise of the frustoconical portion 18. This is particularly true of the longer ribs 21.

It is, of course, desirable that the spoke ribs appear to be flat or straight rather than curved if they are to look more like wire spokes. Hence, I find it desirable to compensate for this curvature by slightly indenting the inclined area or portion 18 so that it is slightly convex in the direction toward the wheel body 11. This convex curvature is very slight and is of the order of about 1/16 of an inch. By so dishing the portion 18, I find I am enabled to cause the embossed spokes to lie flat or, in other words, to be substantially straight along the inclined area or portion 18.

The parts of the portion 18 between the crisscross spokes are preferably given a colored finish so as to accentuate the metallic appearance of the crisscross spokes 20—21. In other words, the outwardly embossed spokes or ribs 20—21 are not painted but are masked during the painting so that they will have their natural metallic luster in the finished cover. If a dark finish is used, the metallic spoke-like ribs stand out against the dark finish and really cause the cover, when it is on the wheel, to make the wheel look as if it is a wire wheel.

In addition, it should be noted that while the cover 15 is shown in the form of a disk with an integral central crown or hub portion 25, it could be made in the form of an annulus with a separate central hub or crown portion as is well known in the art and as is shown in numerous patents heretofore issued to me.

The dished portion 16 of the cover may be provided with a suitable hole or aperture 26 (Fig. 2) through which the free end of the valve stem 13 can project so as to be accessible from the exterior of the wheel.

In applying the cover to the wheel, it is first placed over the wheel with the hole 26 opposite the valve stem 13 and then it is pressed inwardly so that the resilient fingers 19 are engaged under stress with the rim. Inward axial movement of the cover is limited by the outer edge of the cover bottoming at 27 against a flange of the tire rim 10.

Removal of the cover may be easily effected by inserting the blunt end of a tool or screw driver under the cover edge at 27 and by slightly twisting the tool while applying leverage so as to eject the cover from its retained engagement with the rim flange.

I claim as my invention:

1. In a cover structure for a wheel including flanged tire rim and body parts, a circular sheet metal member for disposition on said wheel parts having embossed therein outwardly projecting wire spoke simulating ribs extending angularly relative to the radii of the member, said member at said embossings being inclined into the wheel toward the rim part and being slightly dished inwardly so as to compensate for the angularity of each rib to the radii and whereby said ribs will be substantially flat and straight although inclined toward the rim part of the wheel.

2. In a cover structure for a wheel including flanged tire rim and body parts, a circular sheet metal member for disposition on said wheel parts having embossed therein outwardly projecting wire spoke simulating ribs extending angularly relative to the radii of the member, said member at said embossings being inclined into the wheel toward the rim part an being slightly dished inwardly so as to compensate for the angularity of each rib to the radii and whereby said ribs will be substantially flat and straight although inclined toward the rim part of the wheel, said ribs being arranged in crisscross pairs.

3. In a cover structure for a wheel including flanged tire rim and body parts, a circular sheet metal member for disposition on said wheel parts having embossed therein outwardly projecting wire spoke simulating ribs extending angularly relative to the radii of the member, said member at said embossings being inclined into the wheel toward the rim part and being slightly dished inwardly so as to compensate for the angularity of each rib to the radii and whereby said ribs will be substantially flat and straight although inclined toward the rim part of the wheel, said ribs comprising crisscross long and short pairs of ribs with each shorter pair alternating with the longer pair and with the radially inner extremities of the shorter pairs terminating midway of the length of the longer ribs.

4. In a cover structure for a wheel including flanged tire rim and body parts, a circular sheet metal member for disposition on said wheel parts having embossed therein outwardly projecting wire spoke simulating ribs extending angularly relative to the radii of the member, said member at said embossings being inclined into the wheel toward the rim part and being slightly dished inwardly so as to compensate for the angularity of each rib to the radii and whereby said ribs will be substantially flat and straight although inclined toward the rim part of the wheel, said ribs comprising crisscross pairs of longer and shorter ribs, the shorter pairs of ribs alternating with the longer ones and each terminating radially inwardly in an enlargement arranged in a circle common to the radially inner extremities of the shorter rib embossings.

5. In a cover structure for a wheel including flanged tire rim and body parts, a circular sheet metal member for disposition on said wheel parts having embossed therein outwardly projecting wire spoke simulating ribs extending angularly relative to the radii of the member, said member at said embossings being inclined into the wheel toward the rim part and being slightly dished inwardly so as to compensate for the angularity of each rib to the radii and whereby said ribs will be substantially flat and straight although inclined toward the rim part of the wheel, said ribs being arranged in alternate long and short crisscross pairs with the longer pairs terminating closer to the center of the circular member and the shorter pairs terminating substantially midway between the inner and outer ends of the longer ribs and in a circle defining a medial annular terminal area for the radially inner ends of said shorter pairs, said annular area including an annular groove at said circle to accentuate the inner terminals of the shorter ribs.

References Cited in the file of this patent

UNITED STATES PATENTS

| | | |
|---|---|---|
| D. 166,863 | McLeod | May 27, 1952 |
| D. 168,415 | Lyon | Dec. 16, 1952 |
| 1,884,238 | Reutter | Oct. 25, 1932 |
| 1,975,221 | Booth | Oct. 2, 1934 |
| 2,006,639 | Horn | July 2, 1935 |